(12) United States Patent
Hsieh

(10) Patent No.: US 9,619,196 B2
(45) Date of Patent: Apr. 11, 2017

(54) DUAL EMISSION TYPE DISPLAY PANEL

(71) Applicant: Au Optronics Corporation, Hsinchu (TW)

(72) Inventor: Hsing-Hung Hsieh, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/458,258

(22) Filed: Aug. 13, 2014

(65) Prior Publication Data
US 2015/0048999 A1    Feb. 19, 2015

(30) Foreign Application Priority Data
Aug. 19, 2013 (TW) .............................. 102129669 U

(51) Int. Cl.
*G06F 3/14* (2006.01)
*G09G 3/3225* (2016.01)

(52) U.S. Cl.
CPC ......... *G06F 3/1423* (2013.01); *G09G 3/3225* (2013.01); *G09G 2300/023* (2013.01); *G09G 2300/0426* (2013.01); *G09G 2300/0842* (2013.01)

(58) Field of Classification Search
CPC ......... H01L 2251/5323; H01L 27/3267; H01L 27/3286
See application file for complete search history.

(56) References Cited

U.S. PATENT DOCUMENTS

| | | | |
|---|---|---|---|
| 9,041,280 B2 | 5/2015 | Yan et al. | |
| 2002/0070909 A1* | 6/2002 | Asano | G09G 3/3233 345/76 |
| 2004/0140757 A1 | 7/2004 | Tyan et al. | |
| 2005/0151830 A1* | 7/2005 | Yamazaki | H01L 27/322 347/238 |
| 2006/0033422 A1* | 2/2006 | Chao | H01L 27/3218 313/500 |
| 2008/0316235 A1* | 12/2008 | Okazaki | G02F 1/133514 345/694 |
| 2009/0121983 A1 | 5/2009 | Sung et al. | |

(Continued)

FOREIGN PATENT DOCUMENTS

| | | |
|---|---|---|
| CN | 103227186 | 7/2013 |
| EP | 1439589 | 7/2004 |

(Continued)

*Primary Examiner* — Koosha Sharifi-Tafreshi
(74) *Attorney, Agent, or Firm* — Jianq Chyun IP Office

(57) ABSTRACT

A dual emission type display panel has a front viewing surface and a rear viewing surface. The dual emission type display panel includes a substrate, first, second, and third top emission pixel units, and first, second, and third bottom emission pixel units. The substrate has first and second unit regions. The first, second, and third top emission pixel units, and the first, second, and third bottom emission pixel units are located on the substrate. A first top emission pixel unit, a first bottom emission pixel unit, a second top emission pixel unit, and a second bottom emission pixel unit are located in each first unit region. A third top emission pixel unit, a third bottom emission pixel unit, a second top emission pixel unit, and a second bottom emission pixel unit are located in each second unit region.

16 Claims, 8 Drawing Sheets

(56) References Cited

U.S. PATENT DOCUMENTS

| | | | |
|---|---|---|---|
| 2010/0181557 A1* | 7/2010 | Sun | H01L 51/5234 257/40 |
| 2013/0119413 A1* | 5/2013 | Harada | H01L 51/5048 257/88 |
| 2013/0193843 A1* | 8/2013 | Yan | H05B 33/22 313/504 |

FOREIGN PATENT DOCUMENTS

| | | |
|---|---|---|
| TW | 200603051 | 1/2006 |
| TW | I331479 | 10/2010 |
| TW | 201332094 | 8/2013 |
| TW | I441328 | 6/2014 |

* cited by examiner

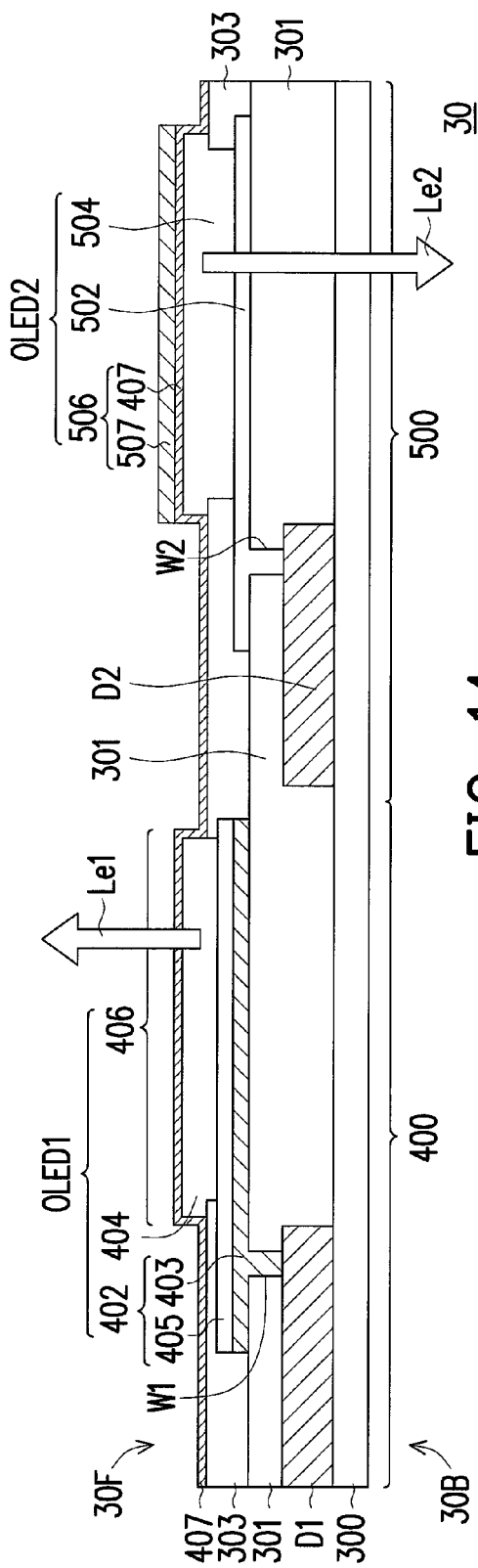
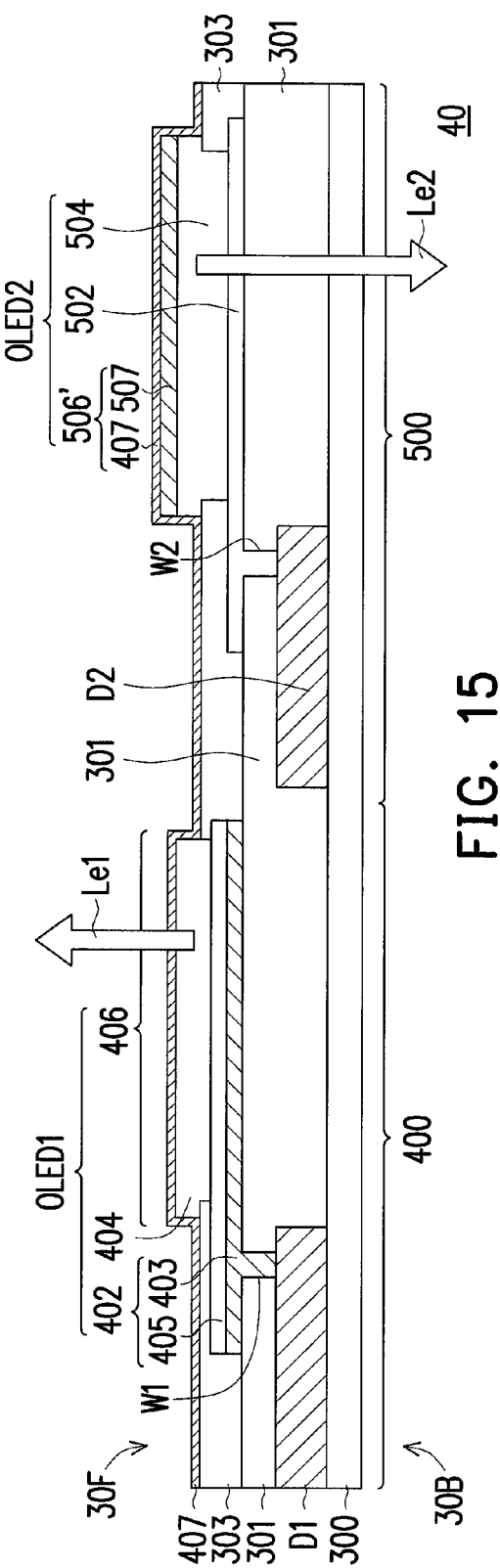

DUAL EMISSION TYPE DISPLAY PANEL

CROSS-REFERENCE TO RELATED APPLICATION

This application claims the priority benefit of Taiwan application serial no. 102129669, filed on Aug. 19, 2013. The entirety of the above-mentioned patent application is hereby incorporated by reference herein and made a part of this specification.

BACKGROUND OF THE INVENTION

Field of the Invention

The invention relates to a display panel. More particularly, the invention relates to a dual emission type organic display panel.

Description of Related Art

An organic light emitting display is a self-emissive display. The organic light emitting display is characterized by wide viewing angle, high response speed (at least 100 times faster than that of liquid crystals), light weight, capability of being miniaturized in response to the hardware and equipment requirements, high light emission efficiency, high color rendering index, etc. Therefore, the organic light emitting display has great potential for development and may become the next-generation flat panel display.

At present, the organic light emitting display may be categorized into a top emission type organic light emitting display and a bottom emission type organic light emitting display according to the direction in which the light is emitted, and both the top emission type organic light emitting display and the bottom emission type organic light emitting display are able to display images in one single direction. Based on the related art, if it is intended to manufacture a dual emission type organic light emitting display, two organic light emitting displays are assembled back-to-back. However, the manufacturing costs of the resultant dual emission type organic light emitting display are high, and the thickness thereof is rather significant.

SUMMARY OF THE INVENTION

The invention is directed to a dual emission type display panel which has the weight and the thickness similar to those of the conventional single-sided emission type display panel but has the improved resolution.

In an embodiment of the invention, a dual emission type display panel having a front viewing surface and a rear viewing surface is provided. The dual emission type display panel includes a substrate, a plurality of first top emission pixel units, a plurality of second top emission pixel units, a plurality of third top emission pixel units, a plurality of first bottom emission pixel units, a plurality of second bottom emission pixel units, and a plurality of third bottom emission pixel units. The substrate has a plurality of first unit regions and a plurality of second unit regions. The first, second, and third top emission pixel units are located on the substrate. The first, second, and third bottom emission pixel units are located on the substrate. One of the first top emission pixel units, one of the first bottom emission pixel units, one of the second top emission pixel units, and one of the second bottom emission pixel units are located in each of the first unit regions. One of the third top emission pixel units, one of the third bottom emission pixel units, one of the second top emission pixel units, and one of the second bottom emission pixel units are located in each of the second unit regions.

In an embodiment of the invention, a dual emission type display panel having a front viewing surface and a rear viewing surface is provided. The dual emission type display panel includes a substrate, a plurality of first top emission pixel units, a plurality of second top emission pixel units, a plurality of third top emission pixel units, a plurality of first bottom emission pixel units, a plurality of second bottom emission pixel units, and a plurality of third bottom emission pixel units. The substrate has a plurality of first unit regions and a plurality of second unit regions. The first, second, and third top emission pixel units are located on the substrate. The first, second, and third bottom emission pixel units are located on the substrate. One of the first top emission pixel units, one of the second bottom emission pixel units, and one of the third top emission pixel units are located in each of the first unit regions, and one of the first bottom emission pixel units, one of the second top emission pixel units, and one of the third bottom emission pixel units are located in each of the second unit regions.

In an embodiment of the invention, a dual emission type display panel that includes a substrate, a plurality of top emission pixel units, and a plurality of bottom emission pixel units is provided. The top emission pixel units are located on the substrate, and each of the top emission pixel units includes a first control device, a reflective anode electrically connected to the first control device, a first organic light emitting layer located on the reflective anode, and a transparent cathode located on the first organic light emitting layer. The bottom emission pixel units are located on the substrate, and each of the bottom emission pixel units includes a second control device, a transparent anode electrically connected to the second control device, a second organic light emitting layer located on the transparent anode, and a reflective cathode located on the second organic light emitting layer.

In view of the above, the top emission pixel units and the bottom emission pixel units in the dual emission type display panel described herein are arranged on the same substrate in a specific arrangement manner, such that the weight and the thickness of the dual emission type display panel described herein are not greater than those of the conventional dual emission type display panel. Moreover, the resolution of the dual emission type display panel described herein may be improved by 1.5 to 2 times in comparison with the conventional dual emission type display panel.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

FIG. 14 is a schematic cross-sectional view illustrating one top emission pixel unit and one bottom emission pixel unit in a dual emission type display panel according to the third embodiment of the invention.

FIG. 15 is a schematic cross-sectional view illustrating one top emission pixel unit and one bottom emission pixel unit in a dual emission type display panel according to a fourth embodiment of the invention.

DETAILED DESCRIPTION OF DISCLOSED EMBODIMENTS

Figure 1:
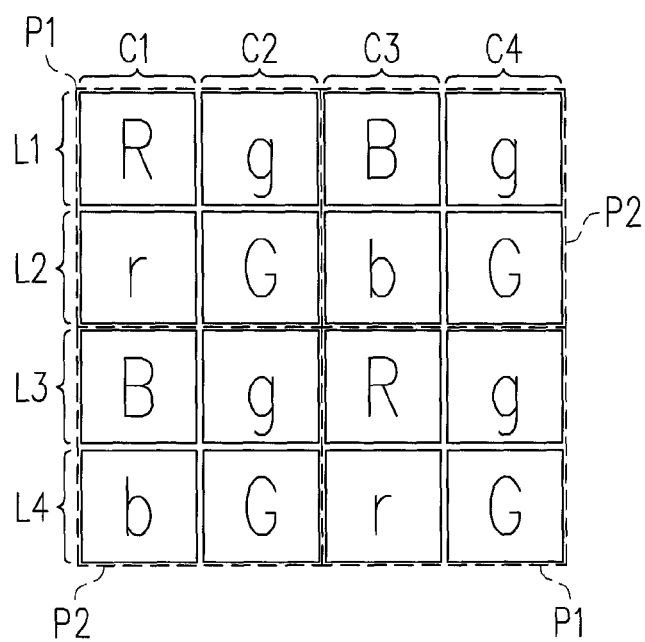
FIG. 1 is a schematic view illustrating a dual emission type display panel according to a first embodiment of the invention.
Figure 2:
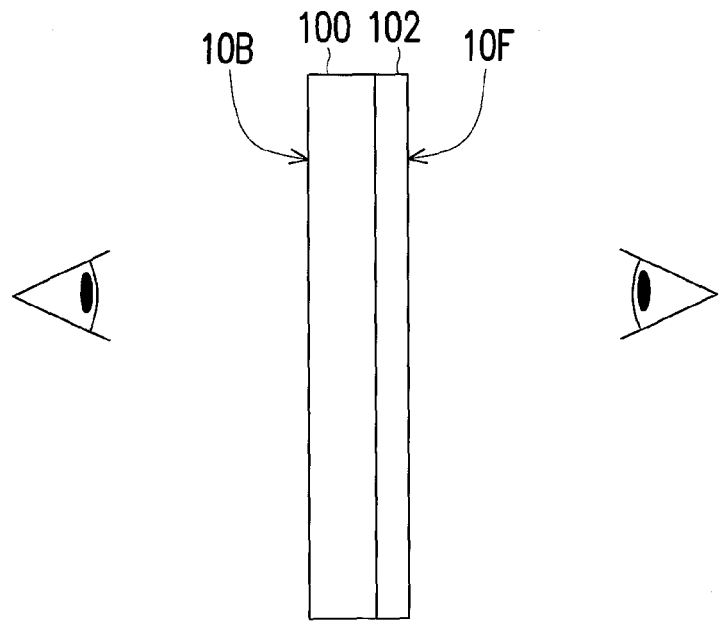
FIG. 2 is a schematic side view illustrating the dual emission type display panel depicted in FIG. 1.
Figure 3:
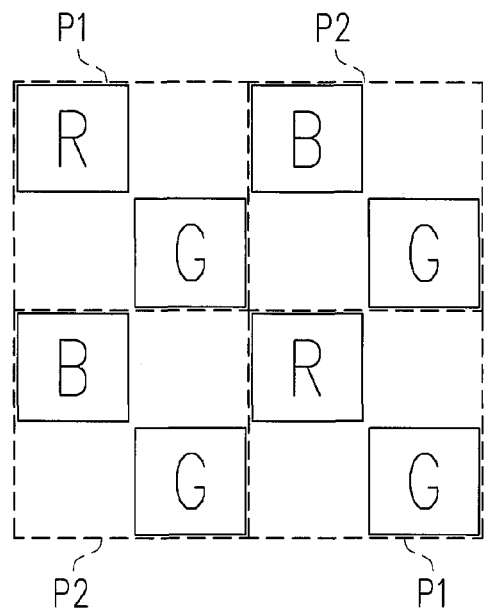
FIG. 3 is a schematic view illustrating a front viewing surface of the dual emission type display panel in FIG. 1.
Figure 4:
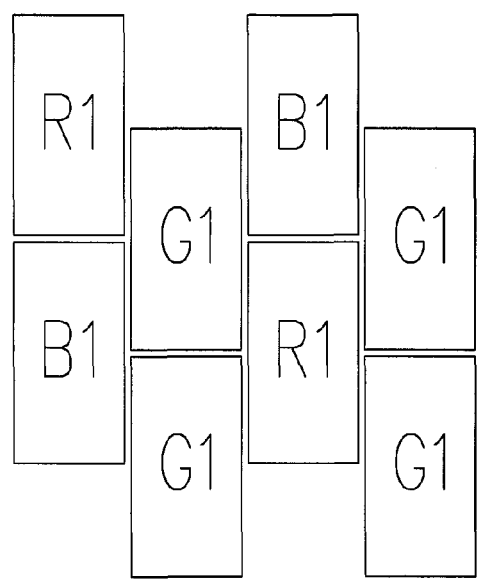
FIG. 4 is a schematic equivalent view illustrating the front viewing surface of the dual emission type display panel in FIG. 3.
Figure 5:
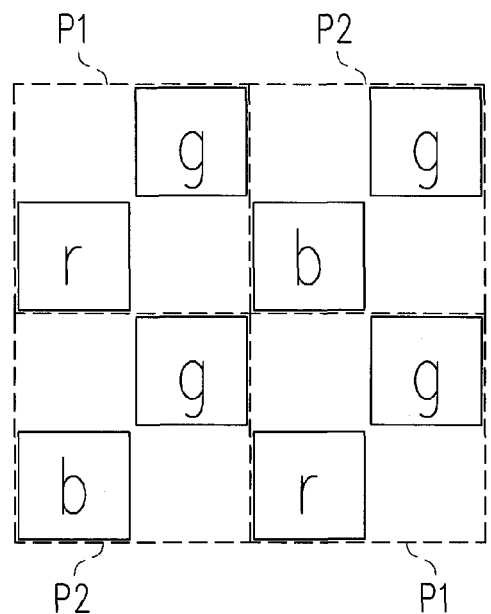
FIG. 5 is a schematic view illustrating a rear viewing surface of the dual emission type display panel in FIG. 1.
Figure 6:
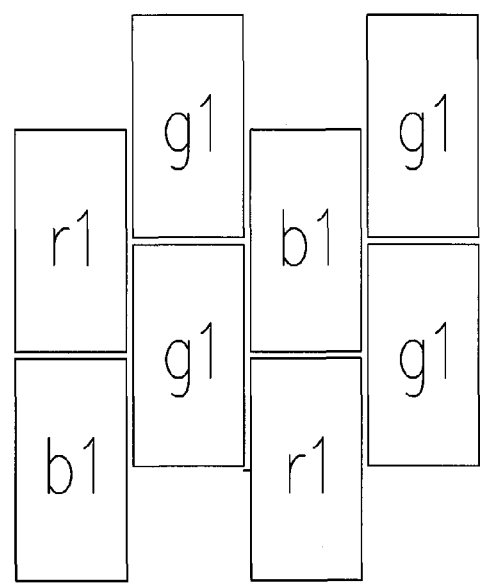
FIG. 6 is a schematic equivalent view illustrating the rear viewing surface of the dual emission type display panel in FIG. 5.

FIG. 1 is a schematic view illustrating a dual emission type display panel according to a first embodiment of the invention. FIG. 2 is a schematic side view illustrating the dual emission type display panel depicted in FIG. 1. FIG. 3 is a schematic view illustrating a front viewing surface of the dual emission type display panel in FIG. 1. FIG. 4 is a schematic equivalent view illustrating the front viewing surface of the dual emission type display panel in FIG. 3. FIG. 5 is a schematic view illustrating a rear viewing surface of the dual emission type display panel in FIG. 1. FIG. 6 is a schematic equivalent view illustrating the rear viewing surface of the dual emission type display panel in FIG. 5.

With reference to FIG. 1 and FIG. 2, the dual emission type display panel 10 described in the present embodiment has a front viewing surface 10F and a rear viewing surface 10B. That is, a user is able to observe images displayed by the dual emission type display panel 10 through the front viewing surface 10F or the rear viewing surface 10B.

In the present embodiment, the dual emission type display panel 10 includes a substrate 100 and a pixel layer 102, and the pixel layer 102 includes a plurality of first top emission pixel units R, a plurality of second top emission pixel units C, a plurality of third top emission pixel units B, a plurality of first bottom emission pixel units r, a plurality of second bottom emission pixel units g, and a plurality of third bottom emission pixel units b. Thereby, the dual emission type display panel 10 is capable of displaying the color of red, green, and blue. However, the invention is not limited thereto, and people having ordinary skill in the pertinent art can adjust the color of the emission pixel units based on actual design requirements.

The substrate 100 has a plurality of first unit regions P1 and a plurality of second unit regions P2. In the present embodiment shown in FIG. 1, one of the first top emission pixel units R, one of the first bottom emission pixel units r, one of the second top emission pixel units G, and one of the second bottom emission pixel units g are located in each of the first unit regions P1, and one of the third top emission pixel units B, one of the third bottom emission pixel units b, one of the second top emission pixel units G, and one of the second bottom emission pixel units g are located in each of the second unit regions P2. To be specific, the first unit regions P1 and the second unit regions P2 are preferably arranged in an alternate manner, such that the first top emission pixel units R, the second top emission pixel units G, the third top emission pixel units B, the first bottom emission pixel units r, the second bottom emission pixel units g, and the third bottom emission pixel units b are evenly arranged on the substrate 100. Namely, in the direction of the same column, the first unit regions P1 and the second unit regions P2 are arranged in the following order: the first unit region P1, the second unit region P2, the first unit region P1, the second unit region P2, . . . ; alternatively, the first unit regions P1 and the second unit regions P2 are arranged in the following order: the second unit region P2, the first unit region P1, the second unit region P2, the first unit region P1, . . . .

In particular, with reference to FIG. 1, the first, second, and third top emission pixel units R, G, and B and the first, second, and third bottom emission pixel units r, g, and b are arranged in columns C1 to C4 and rows L1 to L4 on the substrate 100, and the second top emission pixel units G and the second bottom emission pixel units g are alternately arranged in the same column (i.e., the column C2 and the column C4). From another perspective, in the first unit regions P1, the first top emission pixel units R and the second bottom emission pixel units g are sequentially arranged on the row L1, and the first bottom emission pixel units r and the second top emission pixel units G are sequentially arranged on the row L2; in the second unit regions P2, the third top emission pixel units B and the second bottom emission pixel units g are sequentially arranged on the row L1, and the third bottom emission pixel units b and the second top emission pixel units G are sequentially arranged on the row L2.

Besides, in FIG. 1, FIG. 2, and FIG. 3, when a user watches the dual emission type display panel 10 through the front viewing surface 10F of the dual emission type display panel 10, the dual emission type display panel 10 displays images by means of the first top emission pixel units R, the second top emission pixel units G, and the third top emission pixel units B, as shown in FIG. 3. Namely, the dual emission type display panel 10 displays images by means of the first and second top emission pixel units R and G located in the first unit regions P1 and the second and third top emission pixel units G and B located in the second unit regions P2.

With reference to FIG. 3 and FIG. 4, when the first, second, and third top emission pixel units R, G, and B in FIG. 3 emit light beams from the front viewing surface 10F, the light beams equivalently constitute a plurality of first front display units R1, a plurality of second front display units G1, and a plurality of third front display units B1, as shown in FIG. 4. For instance, each of the first top emission pixel units R exclusively corresponds to one of the first front display units R1. In another aspect, the image observed by the user at this time is constituted by the first front display units R1, the second front display units G1, and the third front display units B1. Besides, the first front display units R1, the second front display units G1, and the third front display units B1 are alternately arranged. Here, the first and third front display units R1 and B1 are alternately arranged on the first and third columns, and the second front display units G1 are arranged on the second and fourth columns, such that the resolution of the front viewing surface 10F of the dual emission type display panel 10 described herein may be improved by 1.5 times in comparison with the conventional dual emission type display panel. Specifically, according to the design of the conventional dual emission type display panel, some of the emission pixel units serve to provide the image that can be observed through the front viewing surface, and other emission pixel units serve to provide the image that can be observed through the rear viewing surface. Thereby, the resolution of the front viewing surface and the resolution of the rear viewing surface of the conventional dual emission type display panel are both reduced by 50%; however, in the dual emission type display panel 10, the first, second, and third top emission pixel units R, G, and B are arranged in the manner depicted in FIG. 3, such that the resolution of the front viewing surface 10F of the dual emission type display panel 10 is increased by 1.5 times in comparison with the conventional dual emission type display panel.

Similarly, with reference to FIG. 1, FIG. 2, and FIG. 5, when a user watches the dual emission type display panel 10 through the rear viewing surface 10B of the dual emission type display panel 10, the dual emission type display panel 10 displays images by means of the first bottom emission pixel units r, the second bottom emission pixel units g, and the third bottom emission pixel units b, as shown in FIG. 5. Namely, the dual emission type display panel 10 displays images by means of the first and second bottom emission pixel units r and g located in the first unit regions P1 and the second and third bottom emission pixel units g and b located in the second unit regions P2.

With reference to FIG. 5 and FIG. 6, as described above, when the first, second, and third bottom emission pixel units r, g, and b in FIG. 5 emit light beams from the rear viewing surface 10B, the light beams equivalently constitute a plurality of first rear display units r1, a plurality of second rear display units g1, and a plurality of third rear display units b1, as shown in FIG. 6. For instance, each of the first rear emission pixel units r exclusively corresponds to one of the first rear display units r1. In another aspect, the image observed by the user at this time is constituted by the first rear display units r1, the second rear display units g1, and the third rear display units b1. Besides, the first rear display units r1, the second rear display units g1, and the third rear display units b1 are alternately arranged. Here, the first and third rear display units r1 and b1 are alternately arranged on the first and third columns, and the second rear display units g1 are arranged on the second and fourth columns, such that the resolution of the rear viewing surface 10B of the dual emission type display panel 10 described herein may be improved by 1.5 times in comparison with the conventional dual emission type display panel. Specifically, according to the design of the conventional dual emission type display panel, some of the emission pixel units serve to provide the image that can be observed through the front viewing surface, and other emission pixel units serve to provide the image that can be observed through the rear viewing surface. Thereby, the resolution of the front viewing surface and the resolution of the rear viewing surface of the conventional dual emission type display panel are both reduced by 50%; however, in the dual emission type display panel 10, the first, second, and third bottom emission pixel units r, g, and b are arranged in the manner depicted in FIG. 5, such that the resolution of the rear viewing surface 10B of the dual emission type display panel 10 is increased by 1.5 times in comparison with the conventional dual emission type display panel.

It can be deduced from the first embodiment that both the arrangement of the first, second, and third top emission pixel units R, G, and B and the arrangement of the first, second, and third bottom emission pixel units r, g, and b in the dual emission type display panel 10 allow the resolution of the front viewing surface 10F and the resolution of the rear viewing surface 10B of the dual emission type display panel 10 to be improved by 1.5 times in comparison with the conventional dual emission type display panel.

Figures 7, 8:
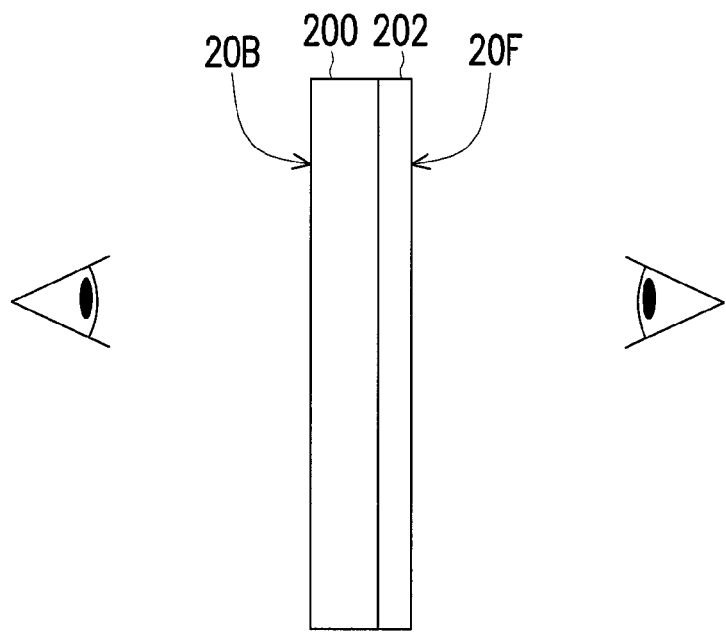
FIG. 7 is a schematic view illustrating a dual emission type display panel according to a second embodiment of the invention.
FIG. 8 is a schematic side view illustrating the dual emission type display panel depicted in FIG. 7.
Figure 9:
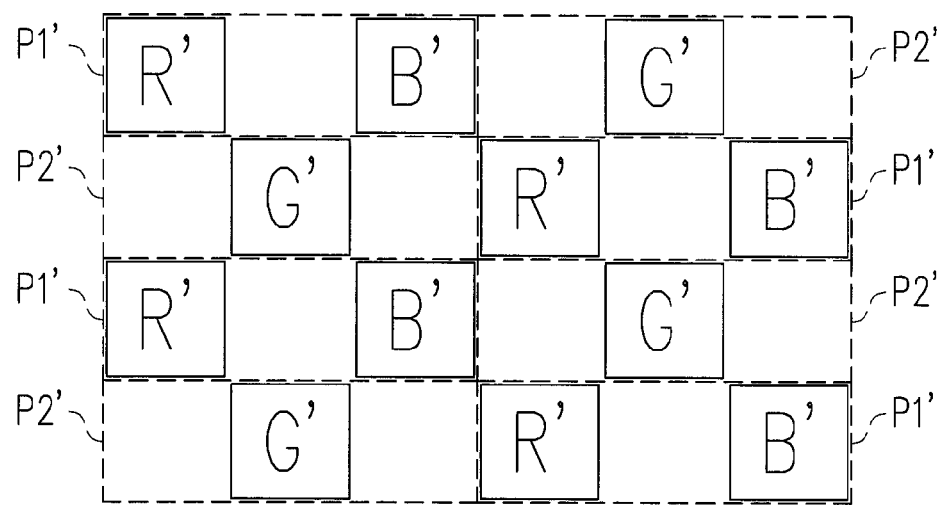
FIG. 9 is a schematic view illustrating a front viewing surface of the dual emission type display panel in FIG. 7.
Figure 10:
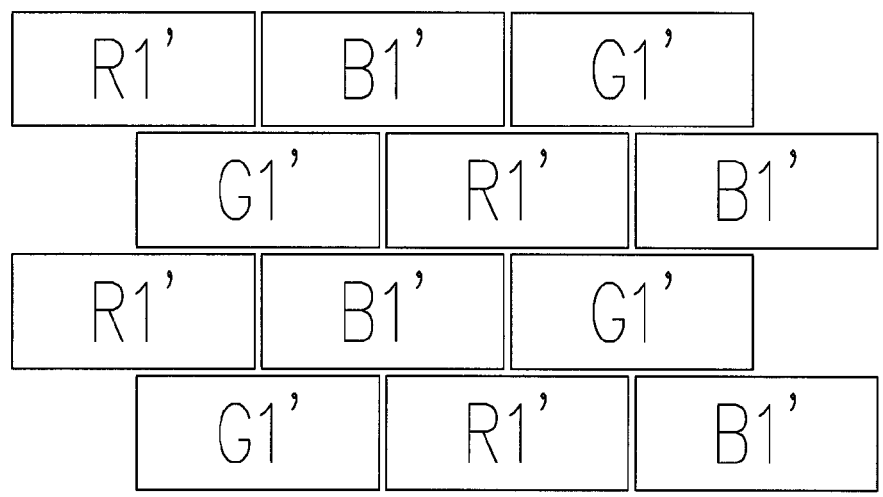
FIG. 10 is a schematic equivalent view illustrating the dual emission type display panel depicted in FIG. 9.
Figure 11:
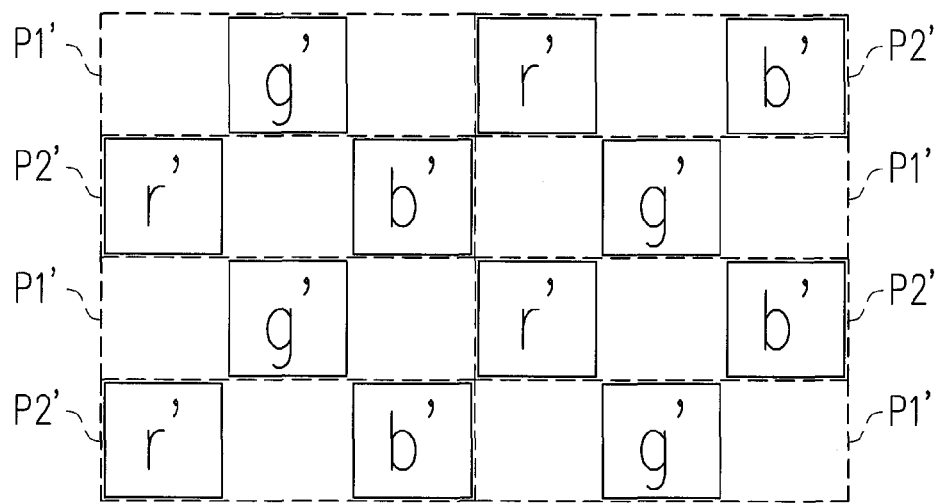
FIG. 11 is a schematic view illustrating a rear viewing surface of the dual emission type display panel in FIG. 7.
Figure 12:
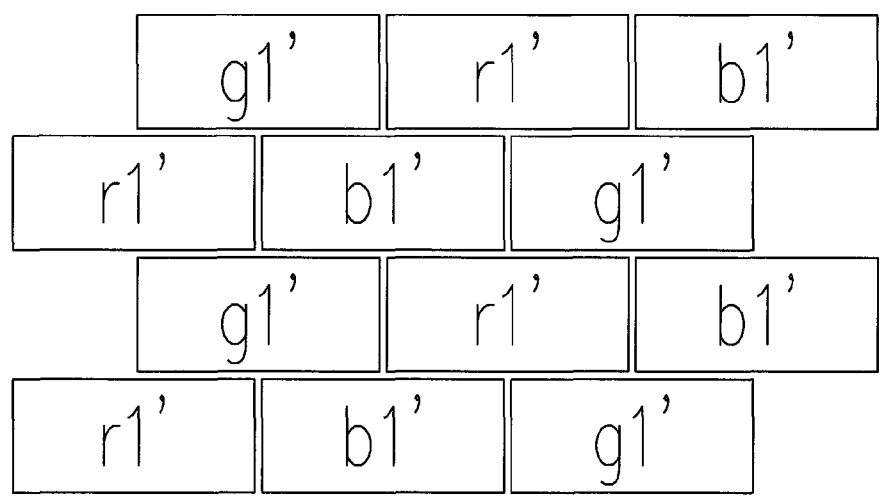
FIG. 12 is a schematic equivalent view illustrating the dual emission type display panel depicted in FIG. 11.

FIG. 7 is a schematic view illustrating a dual emission type display panel according to a second embodiment of the invention. FIG. 8 is a schematic side view illustrating the dual emission type display panel depicted in FIG. 7. FIG. 9 is a schematic view illustrating a front viewing surface of the dual emission type display panel in FIG. 7. FIG. 10 is a schematic equivalent view illustrating the front viewing surface of the dual emission type display panel in FIG. 9. FIG. 11 is a schematic view illustrating a rear viewing surface of the dual emission type display panel in FIG. 7. FIG. 12 is a schematic equivalent view illustrating the rear viewing surface of the dual emission type display panel in FIG. 11.

With reference to FIG. 7 and FIG. 8, the dual emission type display panel 20 described in the present embodiment has a front viewing surface 20F and a rear viewing surface 20B. That is, a user is able to observe images displayed by the dual emission type display panel 20 through the front viewing surface 20F or the rear viewing surface 20B.

In the present embodiment, the dual emission type display panel 20 includes a substrate 200 and a pixel layer 202, and the pixel layer 202 includes a plurality of first top emission pixel units R', a plurality of second top emission pixel units G', a plurality of third top emission pixel units B', a plurality of first bottom emission pixel units r', a plurality of second bottom emission pixel units g', and a plurality of third bottom emission pixel units b'. Thereby, the dual emission type display panel 20 is capable of displaying the color of red, green, and blue. However, the invention is not limited thereto, and people having ordinary skill in the pertinent art can adjust the color of the emission pixel units based on actual design requirements.

The substrate 200 has a plurality of first unit regions P1' and a plurality of second unit regions P2'. In the present embodiment shown in FIG. 7, one of the first top emission pixel units R', one of the second bottom emission pixel units g', and one of the third top emission pixel units B' are located in each of the first unit regions P1', and one of the first bottom emission pixel units r', one of the second top emission pixel units G', and one of the third bottom emission pixel units b' are located in each of the second unit regions P2'. In light of the foregoing, the dual emission type display panel 20 described in the present embodiment is similar to the dual emission type display panel 10 described in the first embodiment, while the difference therebetween lies in the arrangement of the emission pixel units.

To be specific, the first unit regions P1' and the second unit regions P2' are preferably arranged in an alternate manner, such that the first top emission pixel units R', the second top emission pixel units G', the third top emission pixel units B', the first bottom emission pixel units r', the second bottom emission pixel units g', and the third bottom emission pixel units b' are evenly arranged on the substrate 200. Namely, in the direction of the same column, the first unit regions P1' and the second unit regions P2' are arranged in the following order: the first unit region P1', the second unit region P2', the first unit region P1', the second unit region P2', . . . ; alternatively, the first unit regions P1' and the second unit regions P2' are arranged in the following order: the second unit region P2', the first unit region P1', the second unit region P2', the first unit region P1', . . . .

In particular, with reference to FIG. 7, the first, second, and third top emission pixel units R', G', and B' and the first, second, and third bottom emission pixel units r', g', and b' are arranged in columns C1' to C6' and rows L1' to L4' on the substrate 200, the first top emission pixel units R' and the first bottom emission pixel units r' are alternately arranged in the same column (i.e., the column C1' and the column C4'), the second top emission pixel units G' and the second bottom emission pixel units g' are alternately arranged in the same column (i.e., the column C2' and the column C5'), and the third top emission pixel units B' and the third bottom emission pixel units b' are alternately arranged in the same column (i.e., the column C3' and the column C6'). From another perspective, in the first unit regions P1', the first top emission pixel units R', the second bottom emission pixel units g', and the third top emission pixel units B' are sequentially arranged on the row L1'; in the second unit regions P2', the first bottom emission pixel units r', the second top emission pixel units G', and the third bottom emission pixel units b' are sequentially arranged on the row L1'.

Besides, in FIG. 7, FIG. 8, and FIG. 9, when a user watches the dual emission type display panel 20 through the front viewing surface 20F of the dual emission type display panel 20, the dual emission type display panel 20 displays images by means of the first top emission pixel units R', the second top emission pixel units G', and the third top emission pixel units B', as shown in FIG. 9. Namely, the dual emission type display panel 20 displays images by means of the first and third top emission pixel units R' and B' located in the first unit regions P1' and the second top emission pixel units G' located in the second unit regions P2'.

With reference to FIG. 9 and FIG. 10, when the first, second, and third top emission pixel units R', G', and B' in FIG. 9 emit light beams from the front viewing surface 20F, the light beams equivalently constitute a plurality of first front display units R1', a plurality of second front display units G1', and a plurality of third front display units B1', as shown in FIG. 10. For instance, each of the first top emission pixel units R' exclusively corresponds to one of the first front display units R1'. In another aspect, the image observed by the user at this time is constituted by the first front display units R1', the second front display units G1', and the third front display units B1'. Besides, the first front display units R1', the second front display units G1', and the third front display units B1' are alternately arranged in a delta manner, such that the resolution of the front viewing surface 20F of the dual emission type display panel 20 is improved by 2 times in comparison with the conventional dual emission type display panel. Specifically, according to the design of the conventional dual emission type display panel, some of the emission pixel units serve to provide the image that can be observed through the front viewing surface, and other emission pixel units serve to provide the image that can be observed through the rear viewing surface. Thereby, the resolution of the front viewing surface and the resolution of the rear viewing surface of the conventional dual emission type display panel are both reduced by 50%; however, in the dual emission type display panel 20, the first, second, and third top emission pixel units R', G', and B' are arranged in the manner depicted in FIG. 9, such that the resolution of the front viewing surface 20F of the dual emission type display panel 20 is increased by 2 times in comparison with the conventional dual emission type display panel.

Similarly, with reference to FIG. 7, FIG. 8, and FIG. 11, when a user watches the dual emission type display panel 20 through the rear viewing surface 20B of the dual emission type display panel 20, the dual emission type display panel 20 displays images by means of the first bottom emission pixel units r', the second bottom emission pixel units g', and the third bottom emission pixel units b', as shown in FIG. 11. Namely, the dual emission type display panel 20 displays images by means of the second bottom emission pixel units g' located in the first unit regions P' and the first and third bottom emission pixel units r' and b' located in the second unit regions P2'.

With reference to FIG. 11 and FIG. 12, as described above, when the first, second, and third bottom emission pixel units r', g', and b' in FIG. 11 emit light beams from the rear viewing surface 20B, the light beams equivalently constitute a plurality of first rear display units r1', a plurality of second rear display units g1', and a plurality of third rear display units b1', as shown in FIG. 12. For instance, each of the first rear emission pixel units r' exclusively corresponds to one of the first rear display units r1'. In another aspect, the image observed by the user at this time is constituted by the first rear display units r1', the second rear display units g1', and the third rear display units b1'. Besides, the first rear display units r1', the second rear display units g1', and the third rear display units b1' are alternately arranged in a delta manner as well, such that the resolution of the rear viewing surface 20B of the dual emission type display panel 20 is improved by 2 times in comparison with the conventional dual emission type display panel. Specifically, according to the design of the conventional dual emission type display panel, some of the emission pixel units serve to provide the image that can be observed through the front viewing surface, and other emission pixel units serve to provide the image that can be observed through the rear viewing surface. Thereby, the resolution of the front viewing surface and the resolution of the rear viewing surface of the conventional dual emission type display panel are both reduced by 50%; however, in the dual emission type display panel 20, the first, second, and third bottom emission pixel units r', g', and b' are arranged in the manner depicted in FIG. 11, such that the resolution of the rear viewing surface 20B of the dual emission type display panel 20 is increased by 2 times in comparison with the conventional dual emission type display panel.

It can be deduced from the second embodiment that both the arrangement of the first, second, and third top emission pixel units R', G', and B' and the arrangement of the first, second, and third bottom emission pixel units r', g', and b' in the dual emission type display panel 20 allow the resolution of the front viewing surface 20F and the resolution of the rear viewing surface 20B of the dual emission type display panel 20 to be improved by 2 times in comparison with the conventional dual emission type display panel.

It should be mentioned that both the dual emission type display panel 10 and the dual emission type display panel 20 may be organic electroluminescent display panels. If so, all the first top emission pixel units R and R', the second top emission pixel units G and G', and the third top emission pixel units B and B' are top emission type organic electroluminescent pixel units, and all the first bottom emission pixel units r and r', the second bottom emission pixel units g and g', and the third bottom emission pixel units b and b' are bottom emission type organic electroluminescent pixel units, and the detailed structures of these pixel units are described below.

Figure 13:
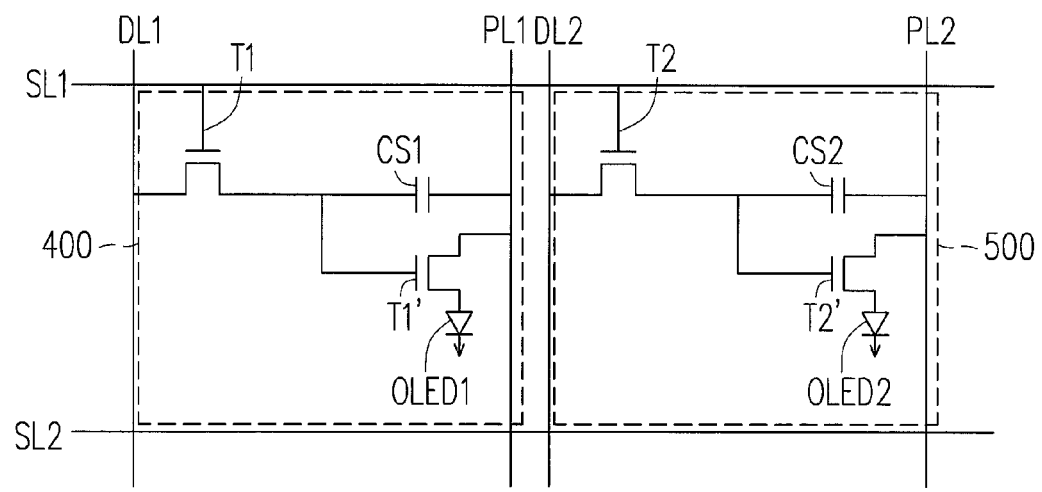
FIG. 13 is an equivalent circuit diagram of one top emission pixel unit and one bottom emission pixel unit in a dual emission type display panel according to a third embodiment of the invention.

FIG. 13 is an equivalent circuit diagram of one top emission pixel unit and one bottom emission pixel unit in a dual emission type display panel according to a third embodiment of the invention. FIG. 14 is a schematic cross-sectional view illustrating one top emission pixel unit and one bottom emission pixel unit in a dual emission type display panel according to the third embodiment of the invention.

With reference to FIG. 13 and FIG. 14, the dual emission type display panel 30 described in the present embodiment has a front viewing surface 30F and a rear viewing surface 30B. The dual emission type display panel 30 includes a substrate 300, a plurality of top emission pixel units 400, and a plurality of bottom emission pixel units 500. Note that the dual emission type display panel 30 may be the aforesaid dual emission type display panel 10 or the aforesaid dual emission type display panel 20; the top emission pixel units 400 may refer to the first top emission pixel units R or R', the second top emission pixel units G or G', or the third top emission pixel units B or B'; the bottom emission pixel units 500 may refer to the first bottom emission pixel units r or r', the second bottom emission pixel units g or g', or the third bottom emission pixel units b or b'. To clearly illustrate the invention, one of the top emission pixel units 400 and one of the bottom emission pixel units 500 adjacent to each other are exemplified, which should not be construed as a limitations to the invention.

In the present embodiment, the substrate 300 is, for instance, a flexible substrate (e.g., made of plastic) or a rigid substrate (e.g., made of glass).

The top emission pixel unit 400 described herein includes a first control device D1, a reflective anode 402, a first organic light emitting layer 404, and a transparent cathode 406, and the reflective anode 402, the first organic light emitting layer 404, and the transparent cathode 406 together constitute an organic light emitting device OLED1.

In detail, the first control device D1 includes active devices T1 and T1' and a capacitor CS1. The active device T1 may be a switch thin film transistor (TFT) and is electrically connected to a scan line SL1 and a data line DL1. The active device T1' may be a driving TFT and is electrically connected to the active device T1 and a power line PL1. The capacitor CS1 is electrically connected to the active devices T1 and T1' and the power line PL1. As discussed above, the top emission pixel unit 400 provided herein structurally includes two active devices (e.g., the active devices T1 and T1') and one capacitor (e.g., the capacitor CS1), i.e., the top emission pixel unit 400 has the 2T1C structure; however, the invention is not limited thereto. In other words, the number of active devices and the number of capacitors in each top emission pixel unit 400 are not limited in the invention. Besides, the dual emission type display panel 30 further includes a planarization layer 301 to cover the first control device D1.

The reflective anode 402 is located on the planarization layer 301 and electrically connected to the first control device D1 through a contact window W1. An insulation layer 303 is located on the planarization layer 301 and exposes a portion of the reflective anode 402. In the present embodiment, the reflective anode 402 includes a reflective metal material 403 and a metal oxide material 405 that are stacked together. Here, the reflective metal material 403 may be silver or aluminum, and the metal oxide material 405 may be indium tin oxide (ITO), indium zinc oxide (IZO), or aluminum zinc oxide (AZO).

The first organic light emitting layer 404 is located on the exposed portion of the reflective anode 402 and includes a red organic light emitting material, a blue organic light emitting material, or a green organic light emitting material. When the first organic light emitting layer 404 includes the red organic light emitting material, the top emission pixel unit 400 may be the first top emission pixel unit R or R'.

The transparent cathode 406 is located on the first organic light emitting layer 404. According to the present embodiment, the transparent cathode 406 includes a thin metal material 407. Specifically, in the present embodiment, the thin metal material 407 is conformably formed on film layers of the substrate 300, which will be elaborated hereinafter. That is, the top and bottom pixel units 400 and 500 together share the thin metal material 407. In detail, the thin metal material 407 in the top emission pixel unit 400 constitutes the transparent cathode 406. In the present embodiment, the thin metal material 407 is aluminum, silver, or magnesium-silver alloy, for instance.

The bottom emission pixel unit 500 described herein includes a second control device D2, a transparent anode 502, a second organic light emitting layer 504, and a reflective cathode 506, and the transparent anode 502, the second organic light emitting layer 504, and the reflective cathode 506 together constitute an organic light emitting device OLED2.

In detail, the second control device D2 includes active devices T2 and T2' and a capacitor CS2. The active device T2 may be a switch TFT and is electrically connected to the scan line SL1 and a data line DL2. The active device T2' may be a driving TFT and is electrically connected to the active device T2 and a power line PL2. The capacitor CS2 is electrically connected to the active devices T2 and T2' and the power line PL2. As discussed above, the bottom emission pixel unit 500 provided herein structurally includes two active devices (e.g., the active devices T2 and T2') and one capacitor (e.g., the capacitor CS2), i.e., the bottom emission pixel unit 500 has the 2T1C structure; however, the invention is not limited thereto. In other words, the number of active devices and the number of capacitors in each bottom emission pixel unit 500 are not limited in the invention. Similarly, the planarization layer 301 also covers the second control device D2.

The transparent anode 502 is located on the planarization layer 301 and electrically connected to the second control device D2 through a contact window W2. In the present embodiment, the transparent anode 502 includes a metal oxide material, e.g., ITO, IZO, or AZO. Thereby, the metal oxide material 405 of the reflective anode 402 in the top emission pixel unit 400 and the transparent anode 502 in the bottom emission pixel unit 500 may be defined simultaneously, and thus the nature and the thickness of the metal oxide material 405 are identical or similar to those of the material of the transparent anode 502. The insulation layer 303 also exposes a portion of the transparent anode 502.

The second organic light emitting layer 504 is located on the exposed portion of the transparent anode 502 and includes a red organic light emitting material, a blue organic light emitting material, or a green organic light emitting material. When the second organic light emitting layer 504 includes the red organic light emitting material, the bottom emission pixel unit 500 may be the first bottom emission pixel unit r or r'.

The reflective cathode 506 is located on the second organic light emitting layer 504. In the present embodiment, the reflective anode 506 includes the thin metal material 407 and a thick metal material 507 that are stacked together. Specifically, in the present embodiment, the thin metal material 407 is conformably formed on the insulation layer 303, the first organic light emitting layer 404, and the second organic light emitting layer 504; hence, as discussed above, the top and bottom pixel units 400 and 500 together share the thin metal material 407. In detail, the thin metal material 407 in the bottom emission pixel unit 500 constitutes the reflective cathode 506. In the present embodiment, the thick metal material 507 is aluminum, silver, or magnesium-silver alloy, for instance.

It should be mentioned that the thick metal material 507 is thicker than the thin metal material 407 in the present embodiment. Besides, the thickness of the thin metal material 407 allows the light beams emitted from the first and second organic light emitting layers 404 and 504 to pass through the thin metal material 407, and the thickness of the thick metal material 507 allows the light beam emitted from the second organic light emitting layer 504 to be reflected by the thick metal material 507.

The dual emission type display panel 30 described herein may further include a protection layer that covers the top and bottom emission pixel units 400 and 500, a cover plate located opposite to the substrate 300, a sealant that seal the top and bottom emission pixel units 400 and 500, a dry material, and other film layers, or other components, etc.

In view of the above, the reflective anode 402 of the organic light emitting device OLED1 in the top emission pixel unit 400 has reflectivity because of the reflective metal material 403, and the transparent cathode 406 is characterized by transparency. Therefore, the light beam Le1 emitted from the first organic light emitting layer 404 is emitted upward after the light beam Le1 is reflected by the reflective anode 402. That is, in the present embodiment, the light beam Le1 emitted from the first organic light emitting layer 404 is emitted out of the front viewing surface 30F. Additionally, the transparent anode 502 of the organic light emitting device OLED2 in the bottom emission pixel unit 500 is characterized by transparency, and the reflective cathode 506 has reflectivity because of the thick metal material 507. Therefore, the light beam Le2 emitted from the second organic light emitting layer 504 is emitted downward after the light beam Le2 is reflected by the reflective cathode 506. That is, in the present embodiment, the light beam Le2 emitted from the second organic light emitting layer 504 is emitted out of the rear viewing surface 30B.

Accordingly, through the front viewing surface 30F of the dual emission type display panel 30, a user is able to observe the image displayed by the top emission pixel units 400; through the rear viewing surface 30B of the dual emission type display panel 30, the user is able to observe the image displayed by the bottom emission pixel units 500. Moreover, since the top and bottom emission pixel units 400 and 500 are respectively controlled by corresponding driver devices, the front viewing surface 30F and the rear viewing surface 30B of the dual emission type display panel 30 may simultaneously display different images. In addition, the top and bottom emission pixel units 400 and 500 are formed on the same substrate 300, and thus the weight and the thickness of the dual emission type display panel 30 described herein are similar to those of the conventional dual emission type display panel. As a result, the problem of increasing the weight and the thickness of the conventional dual emission type display panel will not arise in the dual emission type display panel 30.

FIG. 15 is a schematic cross-sectional view illustrating one top emission pixel unit and one bottom emission pixel unit in a dual emission type display panel according to a fourth embodiment of the invention.

With reference to FIGS. 15 and 14, the dual emission type display panel 40 shown in FIG. 15 is similar to the dual emission type display panel 30 shown in FIG. 14, and therefore identical devices are marked by the same reference numbers and will not be repeated. The difference between the dual emission type display panels 40 and 30 lies in that the thin metal material 407 constituting the reflective cathode 506' in the bottom emission pixel unit 500 of the dual emission type display panels 40 is stacked onto the thick metal material 507, while the thick metal material 507 in the bottom emission pixel unit 500 of the dual emission type display panels 30 is stacked onto the thin metal material 407 that constitutes the reflective cathode 506 in the bottom emission pixel unit 500 of the dual emission type display panels 30.

Hence, in the present embodiment, the reflective anode 402 of the organic light emitting device OLED1 in the top emission pixel unit 400 has reflectivity because of the reflective metal material 403, and the transparent cathode 406 is characterized by transparency. Therefore, the light beam Le1 emitted from the first organic light emitting layer 404 is emitted upward after the light beam Le1 is reflected by the reflective anode 402. That is, in the present embodiment, the light beam Le1 emitted from the first organic light emitting layer 404 is emitted out of the front viewing surface 30F. Additionally, the transparent anode 502 of the organic light emitting device OLED2 in the bottom emission pixel unit 500 is characterized by transparency, and the reflective cathode 506' has reflectivity because of the thick metal material 507. Therefore, the light beam Le2 emitted from the second organic light emitting layer 504 is emitted downward after the light beam Le2 is reflected by the reflective cathode 506'. That is, in the present embodiment, the light beam Le2 emitted from the second organic light emitting layer 504 is emitted out of the rear viewing surface 30B.

Through the front viewing surface 30F of the dual emission type display panel 40, a user is able to observe the image displayed by the top emission pixel unit 400; through the rear viewing surface 30B of the dual emission type display panel 40, the user is able to observe the image displayed by the bottom emission pixel unit 500. Moreover, since the top and bottom emission pixel units 400 and 500 are respectively controlled by corresponding driver devices, the front viewing surface 30F and the rear viewing surface 30B of the dual emission type display panel 40 may simultaneously display different images. In addition, the top and bottom emission pixel units 400 and 500 are formed on the same substrate 300, and thus the weight and the thickness of the dual emission type display panel 40 described herein are similar to those of the conventional dual emission type display panel. As a result, the problem of increasing the weight and the thickness of the conventional dual emission type display panel will not arise in the dual emission type display panel 40.

To sum up, the top emission pixel units and the bottom emission pixel units in the dual emission type display panel described in the previous embodiments are arranged on the same substrate in a specific arrangement manner (as shown in FIG. 1 and FIG. 7), such that the weight and the thickness of the dual emission type display panel described herein are not greater than those of the conventional dual emission type display panel. Moreover, the resolution of the dual emission type display panel described herein may be improved by 1.5 to 2 times in comparison with the conventional dual emission type display panel. Moreover, since the top and bottom emission pixel units in the dual emission type display panel described in the previous embodiments are respectively controlled by corresponding driver devices, the front viewing surface and the rear viewing surface of the dual emission type display panel may simultaneously display different images.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A dual emission type display panel having a front viewing surface and a rear viewing surface and comprising:
a substrate having a plurality of first unit regions and a plurality of second unit regions, wherein the first unit regions and the second unit regions are alternately arranged in each of a plurality of columns and rows;
a plurality of top emission pixel units including a plurality of first top emission pixel units, a plurality of second top emission pixel units, and a plurality of third top emission pixel units located on the substrate; and
a plurality of bottom emission pixel units including a plurality of first bottom emission pixel units, a plurality of second bottom emission pixel units, and a plurality of third bottom emission pixel units located on the substrate, wherein
each of the top emission pixel units and each of the bottom emission pixel units are alternately arranged in a plurality of columns and rows,
each of the first unit regions consists of one of the first top emission pixel units, one of the first bottom emission pixel units, one of the second top emission pixel units, and one of the second bottom emission pixel units, wherein the top emission pixel units and the bottom emission pixel units of each of the first unit regions are arranged in a form of a 2×2 matrix,
each of the second unit regions consists of one of the third top emission pixel units, one of the third bottom emission pixel units, one of the second top emission pixel units, and one of the second bottom emission pixel units, wherein the top emission pixel units and the bottom emission pixel units of each of the second unit regions are arranged in a form of a 2×2 matrix, and
wherein in a row direction, the second top emission pixel units and the second bottom emission pixel units of the first unit regions are not adjacent to the second top emission pixel units and the second bottom emission pixel units of the second unit regions.

2. The dual emission type display panel as recited in claim 1, wherein the first, second, and third top emission pixel units and the first, second, and third bottom emission pixel units are arranged in a plurality of columns and rows, and the second top emission pixel units and the second bottom emission pixel units are arranged in the same column.

3. The dual emission type display panel as recited in claim 1, wherein
the first, second, and third top emission pixel units emitting lights from the front viewing surface constitute a plurality of first front display units, a plurality of second front display units, and a plurality of third front display units, and the first, second, and third front display units are alternately arranged, and
the first, second, and third bottom emission pixel units emitting lights from the rear viewing surface constitute a plurality of first rear display units, a plurality of second rear display units, and a plurality of third rear display units, and the first, second, and third rear display units are alternately arranged.

4. The dual emission type display panel as recited in claim 1,
each of the first, second, and third top emission pixel units comprising:
a first control device;
a reflective anode electrically connected to the first control device;
a first organic light emitting layer located on the reflective anode; and
a transparent cathode located on the first organic light emitting layer;
each of the first, second, and third bottom emission pixel units comprising:
a second control device;
a transparent anode electrically connected to the second control device;
a second organic light emitting layer located on the transparent anode; and
a reflective cathode located on the second organic light emitting layer.

5. A dual emission type display panel having a front viewing surface and a rear viewing surface and comprising:
a substrate having a plurality of first unit regions and a plurality of second unit regions, wherein the first unit regions and the second unit regions are alternately arranged in each of a plurality of columns and rows;
a plurality of top emission pixel units including a plurality of first top emission pixel units, a plurality of second top emission pixel units, and a plurality of third top emission pixel units located on the substrate; and
a plurality of bottom emission pixel units including a plurality of first bottom emission pixel units, a plurality of second bottom emission pixel units, and a plurality of third bottom emission pixel units located on the substrate, wherein
each of the top emission pixel units and each of the bottom emission pixel units are alternately arranged in a plurality of columns and rows,
each of the first unit regions consists of one of the first top emission pixel units, one of the second bottom emission pixel units, and one of the third top emission pixel units, wherein the first top emission pixel unit, the second bottom emission pixel unit and the third top emission pixel unit of each of the first unit regions are arranged adjacently in a same row, and
each of the second unit regions consists of one of the first bottom emission pixel units, one of the second top emission pixel units, and one of the third bottom emission pixel units, wherein the first bottom emission pixel unit, the second top emission pixel unit and the third bottom emission pixel unit of each of the second unit regions are arranged adjacently in a same row,
wherein the first, second, and third top emission pixel units and the first, second, and third bottom emission pixel units are arranged in a plurality of columns and rows, the first top emission pixel units and the first bottom emission pixel units are arranged in the same column, the second top emission pixel units and the second bottom emission pixel units are arranged in the same column, and the third top emission pixel units and the third bottom emission pixel units are arranged in the same column.

6. The dual emission type display panel as recited in claim 5, wherein
the first, second, and third top emission pixel units emitting lights from the front viewing surface constitute a plurality of first front display units, a plurality of second front display units, and a plurality of third front display units, and the first, second, and third front display units are alternately arranged, and
the first, second, and third bottom emission pixel units emitting lights from the rear viewing surface constitute a plurality of first rear display units, a plurality of second rear display units, and a plurality of third rear display units, and the first, second, and third rear display units are alternately arranged.

7. The dual emission type display panel as recited in claim 5,
each of the first, second, and third top emission pixel units comprising:
a first control device;
a reflective anode electrically connected to the first control device;
a first organic light emitting layer located on the reflective anode; and
a transparent cathode located on the first organic light emitting layer;
each of the first, second, and third bottom emission pixel units comprising:
a second control device;
a transparent anode electrically connected to the second control device;
a second organic light emitting layer located on the transparent anode; and
a reflective cathode located on the second organic light emitting layer.

8. The dual emission type display panel as recited in claim 7, wherein the reflective cathode of each of the first, second, and third bottom emission pixel units comprises a thin metal material and a thick metal material stacked together, and the thick metal material is located between the thin metal material and the second organic light emitting layer.

9. The dual emission type display panel as recited in claim 7, wherein the transparent cathode of each of the first, second, and third top emission pixel units comprises a thin metal material.

10. The dual emission type display panel as recited in claim 7, wherein the transparent anode of each of the first, second, and third bottom emission pixel units comprises the metal oxide material.

11. The dual emission type display panel as recited in claim 1, wherein in a column direction, the first top emission pixel units and the first bottom emission pixel units of the first unit regions and the third top emission pixel units and the third bottom emission pixel units of the second unit regions are arranged in the same column.

12. The dual emission type display panel as recited in claim 3, wherein the first, second, and third front display units are arranged in a delta manner, and the first, second, and third rear display units are arranged in a delta manner.

13. The dual emission type display panel as recited in claim 6, wherein the first, second, and third front display units are arranged in a delta manner, and the first, second, and third rear display units are arranged in a delta manner.

14. The dual emission type display panel as recited in claim 4, wherein the reflective cathode of each of the first, second, and third bottom emission pixel units comprises a thin metal material and a thick metal material stacked together, and the thick metal material is located between the thin metal material and the second organic light emitting layer.

15. The dual emission type display panel as recited in claim 4, wherein the transparent cathode of each of the first, second, and third top emission pixel units comprises a thin metal material.

16. The dual emission type display panel as recited in claim 4, wherein the transparent anode of each of the first, second, and third bottom emission pixel units comprises the metal oxide material.

* * * * *